US006986005B2

(12) United States Patent
Vo

(10) Patent No.: US 6,986,005 B2
(45) Date of Patent: Jan. 10, 2006

(54) LOW LATENCY LOCK FOR MULTIPROCESSOR COMPUTER SYSTEM

(75) Inventor: Hahn Vo, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 383 days.

(21) Appl. No.: 10/039,045

(22) Filed: Dec. 31, 2001

(65) Prior Publication Data

US 2003/0126381 A1 Jul. 3, 2003

(51) Int. Cl.
G06F 12/00 (2006.01)

(52) U.S. Cl. ................. 711/152; 711/147; 711/151; 711/153; 711/163; 711/141; 711/146

(58) Field of Classification Search ......... 711/147–148, 711/151–153, 141, 146, 163–164, 118, 145, 711/154, 5
See application file for complete search history.

(56) References Cited

U.S. PATENT DOCUMENTS

| 5,142,676 | A | * | 8/1992 | Fried et al. ............. 711/152 |
| 5,341,491 | A | * | 8/1994 | Ramanujan ............. 711/152 |
| 5,408,629 | A | * | 4/1995 | Tsuchiva et al. ......... 711/151 |
| 5,669,002 | A | * | 9/1997 | Buch ................... 710/200 |
| 5,678,026 | A | * | 10/1997 | Vartti et al. ............. 711/152 |
| 5,740,401 | A | * | 4/1998 | Hanawa et al. ......... 711/152 |
| 5,893,156 | A | * | 4/1999 | Matsumoto ............. 711/145 |
| 5,933,824 | A | * | 8/1999 | DeKoning et al. ......... 707/8 |
| 5,987,550 | A | * | 11/1999 | Shagam ................. 710/119 |
| 6,076,126 | A | * | 6/2000 | Shagam ................. 710/108 |
| 6,092,156 | A | * | 7/2000 | Schibinger et al. ....... 711/145 |
| 6,101,584 | A | * | 8/2000 | Satou et al. ............. 711/152 |
| 6,105,094 | A | * | 8/2000 | Lindeman ............... 710/107 |
| 6,226,717 | B1 | * | 5/2001 | Reuter et al. ............. 711/147 |
| 6,356,983 | B1 | * | 3/2002 | Parks ................... 711/145 |
| 6,405,274 | B1 | * | 6/2002 | Chan ................... 710/200 |
| 6,625,698 | B2 | * | 9/2003 | Vartti ................... 711/141 |
| 6,826,570 | B1 | * | 11/2004 | Eshel et al. ............... 707/8 |
| 2002/0174305 | A1 | * | 11/2002 | Vartti ................... 711/145 |

* cited by examiner

Primary Examiner—Matthew D. Anderson
Assistant Examiner—Zhuo H. Li

(57) ABSTRACT

A multinodal multiprocessor computer system and method is provided in which a first processor can acquire exclusive access to a first memory location in a shared memory, and at the same time a second processor can access to a second memory location of the shared memory that is located in the same node or in any other node of the computer system. Memory controllers in each node of the computer system control access to the shared memory. A switch coupled to each of the memory controllers maintains a lock register, which is shadowed by each of the memory controllers, for controlling access to the first memory location.

37 Claims, 4 Drawing Sheets

LOW LATENCY LOCK FOR MULTIPROCESSOR COMPUTER SYSTEM

CROSS-REFERENCE TO RELATED APPLICATIONS

Not Applicable.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to multiprocessor computer systems and more particularly relates to exclusive access by a processor to shared resources in the multiprocessor computer system.

2. Description of the Related Art

Multiprocessor computer systems combine multiple processors into a single computer system to achieve greater capacity and computational power. In a multiprocessor system, a processor may need exclusive access to shared resources. A typical technique for gaining exclusive access is to use a semaphore or other similar memory location to control access to the shared resource. A processor reads the semaphore to determine if it is available, then writes the semaphore to indicate the processor controls the semaphore if it was available. however, in a multiprocessor system, care must be taken to make this an atomic operation, to prevent one processor from writing to the semaphore after another processor has read the semaphore.

BRIEF SUMMARY OF THE INVENTION

A multiprocessor multibus computer system allows exclusive access to a first memory location in a shared memory by a first processor on a first bus, while allowing access to a second memory location in the shared memory by a second processor on a second bus. A request for exclusive access is made by the first processor. The request is granted and access to the second memory location is allowed during the exclusive access to the first memory location by the first processor.

In one embodiment, requesting exclusive access is performed by asserting a lock signal on a first bus and sending a lock request to a memory controller coupled to the first bus, the second bus, and the shared memory. In a further embodiment, a split lock signal is asserted on the first bus, indicating the first memory location contains two memory address data.

In a further embodiment, a lock request is forwarded from the memory controller to a switch and the first processor is signaled to retry the lock request.

In a further embodiment, granting exclusive access is performed by signaling the memory controller by the switch to retry the lock request, assigning exclusive access to the memory location by the switch, notifying the memory controller to assign the first memory location to the first processor, and granting exclusive access to the first memory location by the memory controller responsive to a retry by the processor.

In a further embodiment, assigning exclusive access is performed by determining if the first memory location is currently assigned and saving a lock request information if not. The lock request information is sent to the memory controller.

In one embodiment, the lock request information contains a node id, cycle id, and memory address data. In a further embodiment, the memory address data can contain two memory addresses, which can be non-contiguous.

In one embodiment, the first processor releases the exclusive access.

In another embodiment, a multinodal computer system allows requesting and granting exclusive access to a first memory location by a first processor of a first multiprocessor node, while allowing a second processor access of a second multiprocessor node to a second memory location. In a further embodiment, a memory controller of the first multiprocessor node forwards the exclusive access request to a switch connected to all of the multiprocessor nodes. The switch grants exclusive access to the first processor, and broadcasts lock request information corresponding to the exclusive access request to memory controllers in all of the multiprocessor nodes, which shadow the lock request information.

BRIEF DESCRIPTION OF THE SEVERAL VIEWS OF THE DRAWINGS

A better understanding of the present invention can be obtained when the following detailed description of some embodiments is considered in conjunction with the following drawings in which.

DETAILED DESCRIPTION OF THE INVENTION

Figure 1:
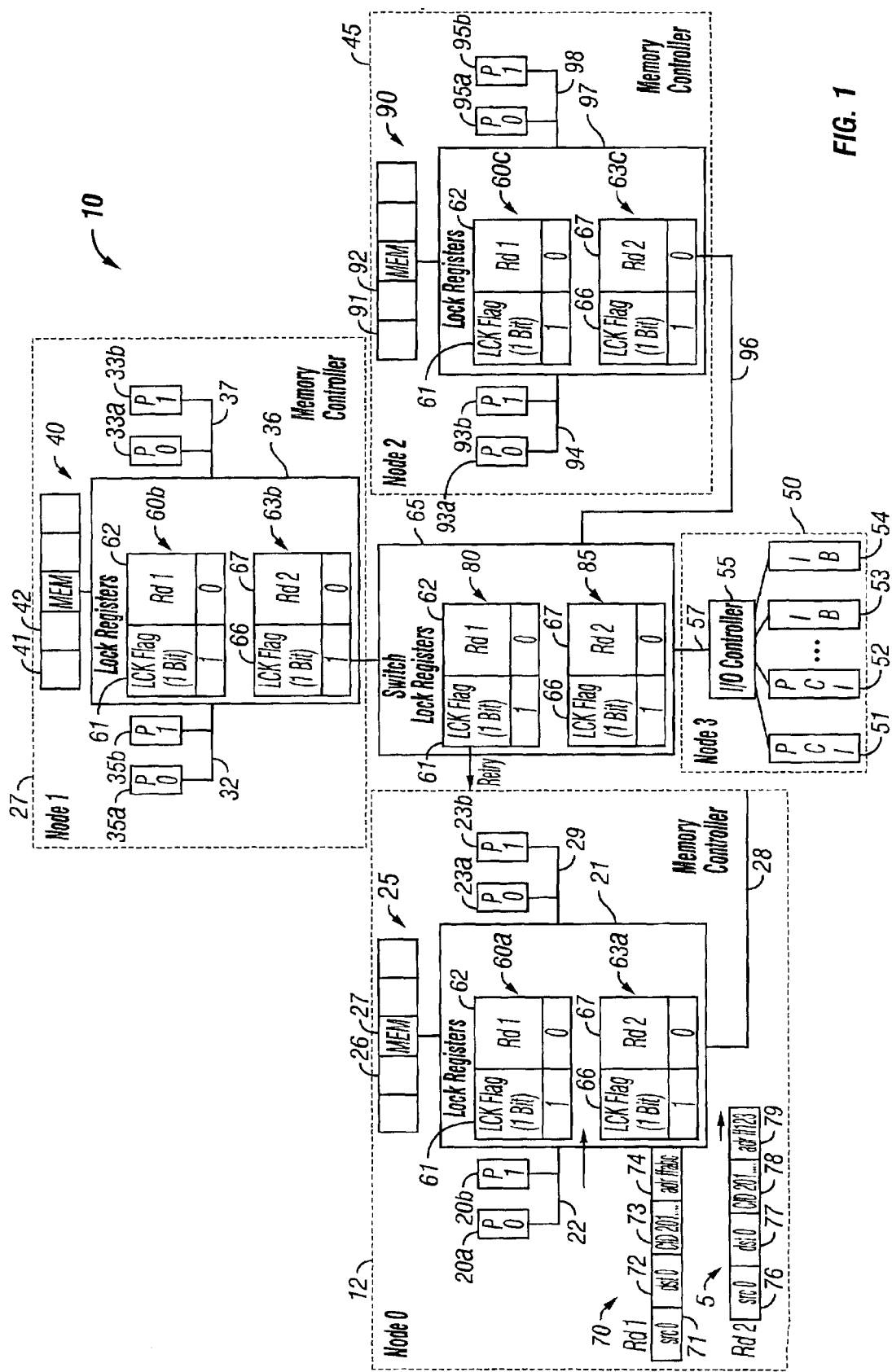
FIG. 1 is a block diagram illustrating an exemplary multinodal multiprocessor system according to one embodiment.

FIG. 1 is a block diagram illustrating an exemplary multinodal multiprocessor system 10 according to one embodiment that allows a processor to acquire exclusive access to a shared resource while allowing other processors access to other shared resources.

The multiprocessor system, for illustration, is shown as made up of four nodes labeled 12, 27, 45, and 50 respectively. These nodes are alternatively identified as node 0, node 1, node 2, and node 3 and are shown enclosed in dashed lines. All nodes are coupled to a switch 65. The nodes 0, 1 and 2, in this example illustration, are identical in structure. However, other embodiments are contemplated in which some nodes may have different numbers of processors, different bus structures, different memory controllers, or other components.

In the exemplary embodiment, the system 10 utilizes twelve microprocessors 20a–b, 23a–b, 33a–b, 35a–b, 93*a–b*, and 95*a–b*. The nodes 0–2 of the computer system 10 utilize a split bus configuration in which the processors 20*a–b* are coupled to a bus 22, processors 23*a–b* are coupled to a bus 29, processors 33*a–b* are coupled to a bus 37, processors 35*a–b* are coupled to a bus 32, processors 93*a–b* are coupled to a bus 94, and processors 95*a–b* are coupled to a bus 98. It should be understood that the processors 20*a–b*, 23*a–b*, 33*a–b*, 35*a–b*, 93*a–b*, and 95*a–b* may be of any suitable type, such as a microprocessor available from Intel, AMD, or Motorola, for example. Furthermore, any suitable bus arrangement may be coupled to the processors 20*a–b*, 23*a–b*, 33*a–b*, 35*a–b*, 93*a–b*, and 95*a–b*, such as a single bus, a split bus (as illustrated), or individual busses. By way of example, the exemplary computer system 10 may utilize Intel Pentium III processors and the busses 22, 29, 37, 32, 94, and 98 may operate at 100/133 MHz.

Still referring to FIG. 1, processors 20*a–b* are coupled to a memory controller 21 by the bus 22 and processors 23*a–b* are coupled to the memory controller 21 by the bus 29. A memory 25 having memory locations 26 and 27 is coupled to the memory controller 21 such that each of the processors 20 and processors 23 of node 0 as well as processors 33, 35, 93, and 95 of nodes 1 and 2 can communicate with the memory 25 via the memory controller 21. The memory controller 21 has lock registers 60*a* and 63*a*. The lock register 60*a* has a lock flag 61 of length 1 bit and a field 62 for storing a request 70 (explained in detail in the next paragraph). Similarly, the second lock register 63*a* has a lock flag 66 of length 1 bit and a field 67 for storing a request 75. The lock registers 60*a* and 63*a* are used to store lock request information corresponding to a request by one of the processors 20 for exclusive access to memory location 26. Lock register 63*a* is used when the lock request involves a second memory address, as described in detail below.

The memory controller 21 can receive an exclusive access request 70 from any of the processors 20 or processors 23. The request 70 has a field 71 indicating the source node, in this example node 0, a field 72 indicating the destination node, in this example node 0, a field 73 indicating a cycle ID number, in this example cycle ID 201, and a field 74 indicating an address of the memory location, in this example FFABC, for which exclusive access is requested. Similarly, processor request 75 has a field 76 indicating the source node, a field 77 indicating the destination node, a field 78 indicating the cycle ID number, and a field 79 indicating the address of a second memory location, for example memory location 27. The memory controller 21 is connected to a switch 65.

The switch 65 includes two lock registers 80 and 85. The lock register 80 includes a lock flag 61 that is 1 bit in length and a field 62 for storing the request 70. The lock register 85 includes a lock flag 66 that is 1 bit in length and a field 67 for storing the request 75. The switch 65 is connected to the memory controller 21 of node 0 by a bus 28, to the memory controller 36 of node 1 by a bus 39, to the memory controller 97 of node 2 by a bus 96, and to an I/O controller of node 3 by a bus 57.

Structures of node 1 and node 2 are similar to that of node 0, except that each node has its own separately identifiable processors, memory, memory locations, and memory controller having two lock registers. Node 1 is connected to the switch by a bus 39, and node 2 is connected to the switch 65 by a bus 96. Similarly, processors 35*a–b* and 33*a–b* are coupled to a memory controller 36 and a shared memory 40, while processors 93*a–b* and 95*a–b* are coupled to a memory controller 97 and a shared memory 90. Also, memory controllers 36 and 97 have lock registers 60*b* and 60*c* and second lock registers 63*b* and 63*c*, respectively. As will be explained below, lock registers 60*a–c* and 63*a–c* are shadowed copies of the lock register 80 and the second lock register 85 in the switch 65. Although the following will be described in terms of granting an exclusive access request from processor 20*a*, the disclosed technique allows exclusive access by any processor in the computer system 10.

As shown in FIG. 1, node 3 has an I/O controller 55 connected to the switch 65 by a bus 57. The I/O controller 55 is shown connected to PCI devices 51 and 52. The I/O controller 55 is also shown connected to Infiband bridges 53 and 54. The I/O controller 55 may be connected to other devices as desired. In another embodiment, node 3 can be a multiprocessor node similar to nodes 0–2.

Figure 2:
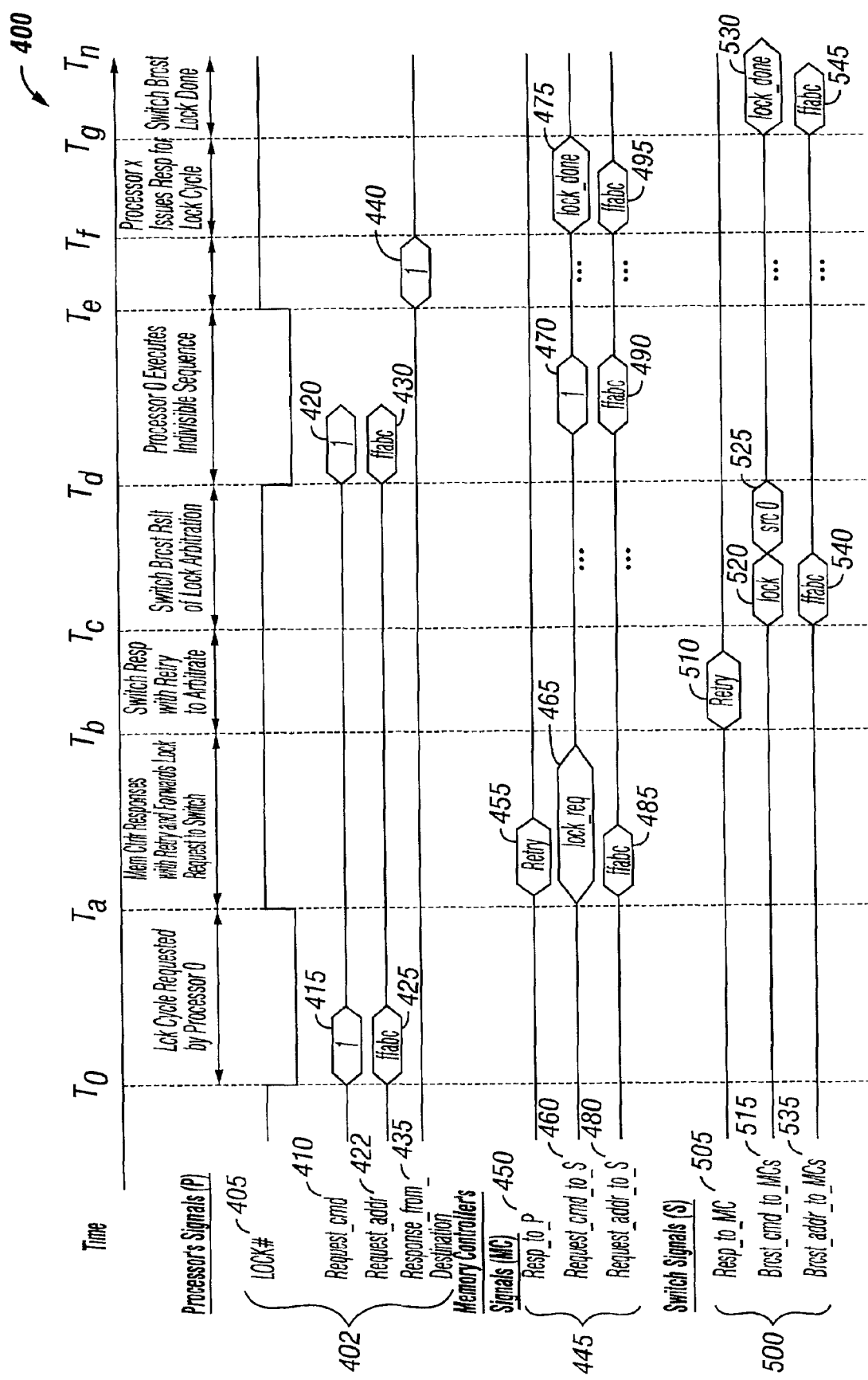
FIG. 2 is a timing diagram of various signals of the multiprocessor system of FIG. 1, illustrating a request to acquire exclusive access to a shared resource according to one embodiment.

Now referring to FIG. 2, timing diagram 400 illustrates various signals of the multiprocessor system 10 when one of the processors 20*a* attempts to acquire exclusive access to a shared memory location according to one embodiment. When the processor 20*a* attempts to acquire exclusive access to a memory location 26 in memory 25 within the node 0, or, for example, to a memory location 41 in memory 40 in node 1, a sequence of signals 402 are issued on the processor bus 22. The processor bus signals 402 include a LOCK# signal 405, a request command signal 410, a request address signal 422, and a response from the destination signal 435 using conventional processor bus signals. Although as shown, the signals follow standard Intel PENTIUM PRO® processor bus signals, similar signaling techniques on other processors could be used. By convention, signals whose name ends with the # character are asserted at a low voltage.

The LOCK# signal indicates a request by the processor 20*a* to lock the processor bus 22 for an atomic operation such as a read-modify-write transaction. During the atomic operation, no other processor on the bus 22 is allowed to access the bus 22. However, the processors 23*a–b* of node 0 and the processors 33*a–b*, 35*a–b*, 93*a–b*, and 95*a–b* of nodes 1 and 2 and the busses 29, 32, 37, 94, and 98 are not locked. In response to the LOCK# signal 405, the memory controller signals 445 are generated by the memory controller 21. The memory controller signals 445 include a response to processor signal 450 on the bus 22, and a request command signal to switch signal 460 and a request address to switch signal 480 on the switch bus 28. Responsive to the memory controller signals 445, the switch signals 500 include a response to memory controller signal 505, a broadcast command to all memory controller signal 515, and a broadcast address to all memory controllers signal 535.

For illustration, when the processor 20*a* requests exclusive access to a memory location 26, it asserts the LOCK# signal 405 at clock cycle $T_0$ and issues a request command 415, and a request address 425 to the memory controller 21. In response, the memory controller 21 issues a retry command 455 to the processor 20*a* on the Resp_to_P signal line 450. The memory controller 21 then issues a lock request 465 to the switch 65 on the Request_cmd_to_S signal line 460, providing the requested memory location address 485 at clock cycle $T_a$. In response to the memory controller's lock request 465, the switch 65 issues a retry command 510 to the memory controller 21 on a request_to_MC signal line 505 at clock cycle $T_b$. After issuing the retry command 510, the switch 65 determines if the requested memory location 26 is available and lock registers 80 (and 85, if a split lock transaction is requested) are available for writing. In one embodiment, the switch 65 then arbitrates among all requests for exclusive access to the memory location 26 received from other requesting processors. The switch 65 then broadcasts a lock command 520 at clock cycle $T_c$ to all memory controllers 21, 36, and 97 of the computer system 10 with a source node ID 525 and address 540, storing this information in the lock register 80. In response to the broadcast from the switch 65, all memory controllers store the source node ID and address in lock registers 60a, 60b and 60c as a shadow copy of the contents of the lock register 80 in the switch 65. After granting exclusive access to the memory location 26 to the processor 20a, the memory controller 21 denies all other requests for access to the memory location 26. However, requests for access to other memory locations by other processors are allowed. Thus, processor 20a can be given exclusive access to a memory location while processors on bus 29 in node 0 and in nodes 1 and 2 can access other memory locations.

At clock cycle $T_d$, the processor 20a retries the request made at clock cycle $T_0$, asserting the LOCK# signal, and putting the command and address on the Request_cmd 410 and Request_addr 422 signal lines. The memory controller 21 then places the command and address on the Request_cmd_to_S 460 and Request_addr_to_S signal lines. Because the switch 65 does not respond with a Retry on the Resp_to_MC 505 signal line, the memory controller 21 allows the request and grants access to the memory location.

After the processor P0 has completed the transaction requiring exclusive access to the memory location 26 the processor P0 deasserts the LOCK# signal at time $T_e$. At some clock cycle $T_f$, after the lock signal is deasserted, the memory controller 21 responds to deassertion of the LOCK# signal by placing a lock_done command 475 on the Request_cmd_to_S 460 signal line and the memory address 495 of memory location 26 on the Request_addr_to_S 480 signal line. The switch 65 then clears the lock register 80 and broadcasts a lock_done command 530 to all the memory controllers 21, 36, and 97 of the computer system 10, which clear their shadowed copy of the lock registers by comparing the lock register contents with the contents of the broadcast lock_done signal 530.

Figure 3:
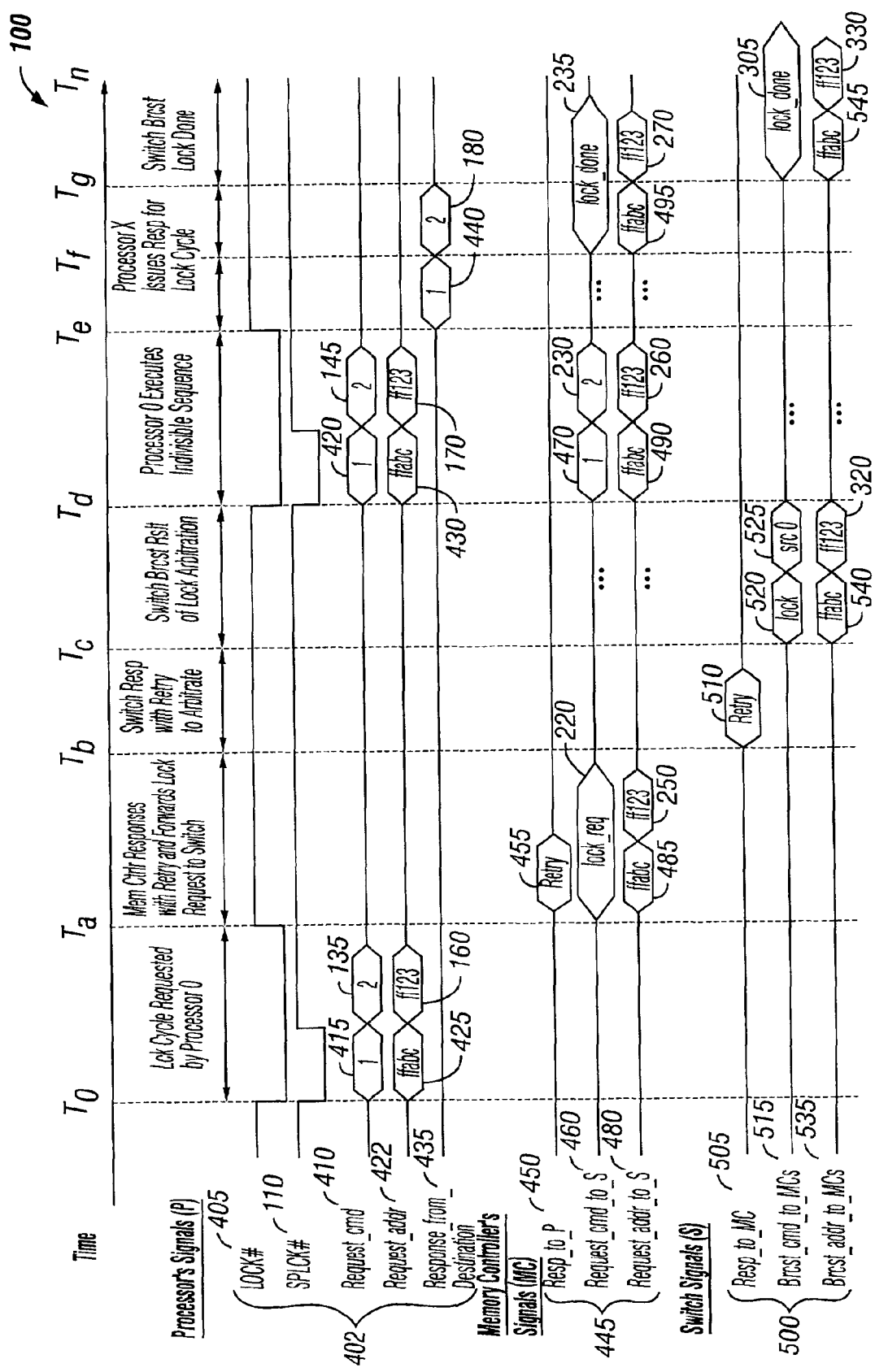
FIG. 3 is a timing diagram of various signals of the multiprocessor system of FIG. 1, illustrating another request to acquire exclusive access to a shared resource according to one embodiment.

FIG. 3 outlines the general usage of the LOCK# signal 405 and the split lock (SPLCK#) signal 110. The LOCK# signal 405 is asserted to block other agents (e.g. other processors in a multiprocessor system) from acquiring the bus 22. This action is typically used, for example, when a processor needs to execute two or more indivisible transactions i.e. read-modify-write of a system variable. The split lock signal 110 is typically asserted when a locked sequence is misaligned on a natural boundary of a shared memory (hence the term split lock). In a split lock situation, a normally 1-transaction read of memory becomes a 2-transaction read due to the splitting of the information. Natural boundaries in a memory typically are 128 bytes length for cacheable memory accesses, and 8 bytes for uncacheable memory accesses. The split lock signal 110 is asserted for the first transaction in a locked sequence. Asserting the LOCK# signal 405 indicates that a command 415 is issued on the request_cmd signal line 410 and a request address 422 is issued on the request_addr signal line 422 in the first clock cycle after the assertion of the LOCK# signal 405. If (as shown in FIG. 3) the SPLCK# signal 110 is asserted in the first clock cycle after assertion of the LOCK# signal 405, then a second command 135 and a second address 160 are issued on the request_cmd signal line 410 and request_addr signal line 425. The transactions issued by the processor 20a as a result of the LOCK# (and SPLCK# if necessary) are indivisible. The processor 20a will keep the LOCK# signal asserted for the length of the entire transaction. When the LOCK# signal 405 is asserted alone, the processor 20a typically wants to read the resource, modify it and write it back without interruptions. When the split lock signal 110 is asserted with the LOCK# signal 405, the processor typically wants to read then write a memory location that spans a boundary in the shared memory and, therefore, requires two indivisible transactions.

The requested memory locations may be in a single node or may be located in two different nodes. The requested memory locations may be contiguous or may be located in two non-contiguous locations. Elements identical to those in FIG. 2 have the same reference numbers. As in FIG. 2, the processor 20a asserts the LOCK# signal 405 at clock cycle $T_0$. In FIG. 3, however, the SPLCK# signal 110 is also asserted in clock cycle $T_0+1$, indicating that a second command 135 is issued on the Request_cmd 410 signal line and a second address 160 is issued on the Request_addr 422 signal line. The memory controller 21 in response issues a split lock lock_req command 220 on the Request_cmd_to_S 460 signal line, indicating that the second address 250 is being sent on the Request_addr_to_S 480 signal line. The exclusive access is granted by the switch 65 for both addresses, using a second lock register 85 otherwise identical to lock register 80 for storing the second lock request information. The broadcast of the lock register information on the Brcst_cmd_to_MCs 515 signal line and the Brcst_addr_to_MCs 535 signal line and all other times in which an address is transmitted on one of the signal line groups 402, 445, or 500 transmits both addresses. Likewise, at all times in which the command issued by the processor is transmitted on any of those signal lines, the second command 135 is issued on the next clock cycle on that signal line. Otherwise, the sequence of events is the same as that shown in FIG. 2.

During the time processor 20a has exclusive access to memory location 26 in node 0, another processor in any of the nodes may be granted non-exclusive access to a different memory location in any of the nodes according to the computer system's protocol for non-exclusive access to shared resources. Although additional lock registers in the memory controllers 21, 36, and 97 and the switch 65 could be used to allow multiple exclusive access grants in the computer system 10, preferably only one exclusive access should be granted at a time. Otherwise, care must be taken to avoid deadlock situations. Conventional computer memory allocation protocols require disabling all bus communication and processors in a multiprocessor computer system except the processor which has acquired exclusive access to a shared memory location on the bus associated with the processor. For example, the processor 95b of node 2 may acquire non-exclusive access to the memory location 27 in memory 25 or alternatively to memory location 42 in memory 40 at the same time the processor 20a has exclusive access to the memory location 26. Although as described above, the processor 20a can obtain exclusive access to memory location 26 in the same node 0, the technique described herein allows the processor 20a to acquire exclusive access to a memory location 41 or 91 in the node 1 or node 2 of the computer system 10, while other processors 23, 35, 33, 93, and/or 95 can obtain non-exclusive access to memory locations 27, 42, and 92. In other words, the grant of exclusive access is system-wide, but does not interfere with non-exclusive access by any processor not on the same bus 22 as the processor 20a obtaining exclusive access, regardless of the location of the memory location for which exclusive or non-exclusive access is granted. Thus, the performance degradation of conventional computer systems, which typically prevent even non-exclusive access to memory in a different node from a processor obtaining exclusive access, is alleviated.

Figure 4:
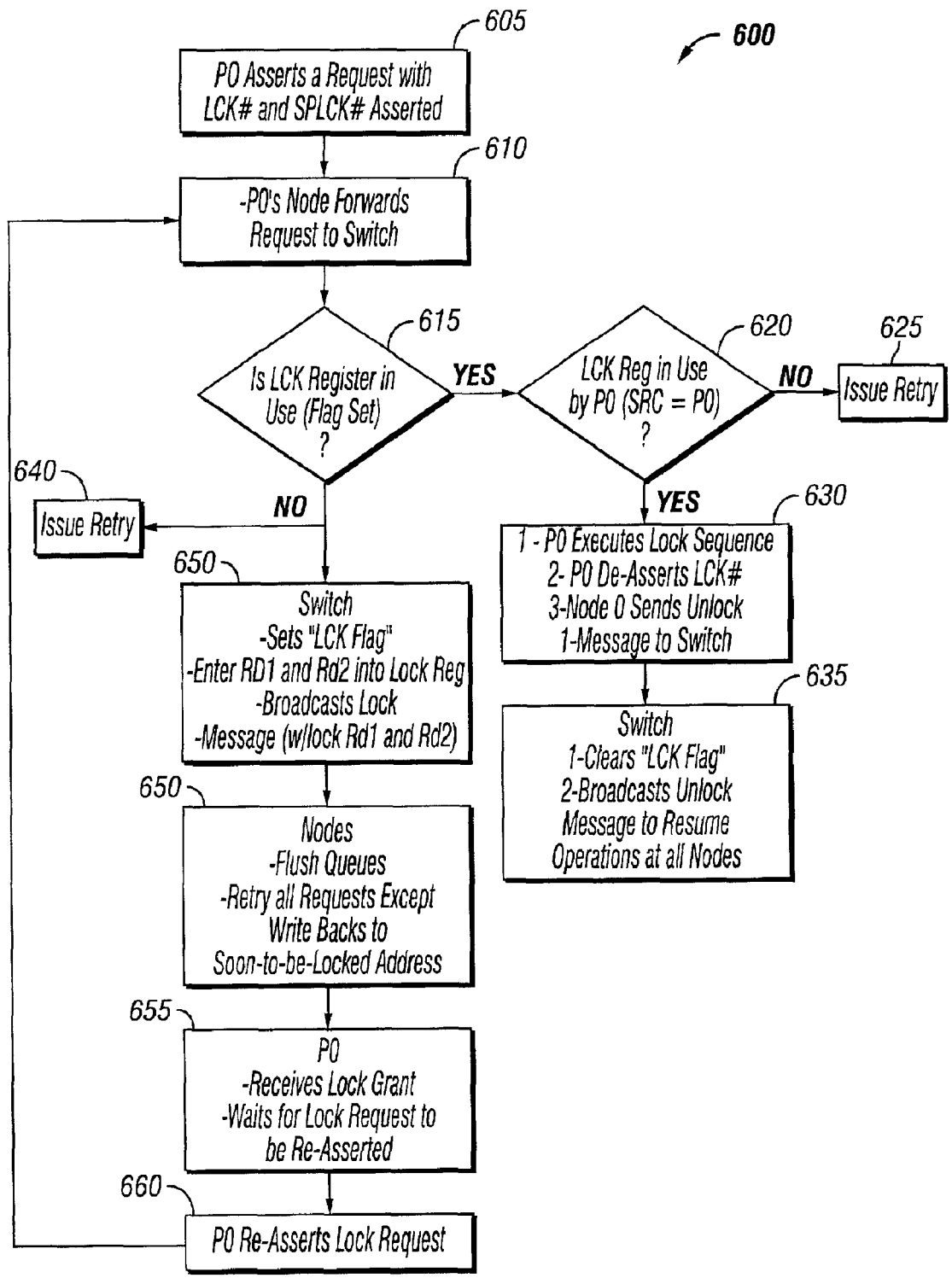
FIG. 4 is a flowchart illustrating a technique for allowing a processor to acquire exclusive access to a shared resource according to one embodiment.

Now referring to FIG. 4, a flowchart 600 illustrates a disclosed technique for acquiring exclusive access to a shared memory location. Reference numbers to signal lines in the discussion below refer to signal lines shown in FIGS. 2–3 as described above. Although the discussion below is given assuming that both the LOCK# and SPLCK# signals are asserted as in FIG. 3, similar steps are performed when only the LOCK# signal is asserted as in FIG. 2. In step 605, when the processor 20a (referred to as P0 in FIG. 4) needs exclusive access to a memory location, it asserts the LOCK# signal 405 and the split lock signal 110. In step 610, the memory controller 21 of the node 0 forwards the request to the switch 65. In step 615, the switch 65 checks to determine if the lock flag 61 of the lock register 80 is set, indicating the lock register is in use. If the lock flag 61 is set, in step 620 the switch 65 checks to see if the lock register 80 is in use by the processor P0 of processors 20. If the lock register 80 is not in use by the processor P0, in step 625 the switch 65 issues a retry command. Other techniques could be used to determine availability of the lock register 80, including arbitration among multiple simultaneous requests. Further, as explained above, if multiple exclusive access grants are allowed, additional lock registers could be checked for availability if the lock register 80 is in use. If the lock register 80 is in use by the processor 20a, in step 620, the signaling sequence of clock cycles $T_d$ to $T_g$ described with reference to FIG. 3 is executed to obtain and use the exclusive access in substep 1, then the LOCK# signal is deasserted in substep 2, and the memory controller 21 sends an unlock message to the switch 65 in substep 3. In step 635, the switch 65 clears the lock flag in the lock register 80, to indicate the lock register 80 is no longer in use, in substep 1, then broadcasts an unlock message to resume operations at all nodes in substep 2.

If the lock register 80 is not in use, the switch 65 issues a retry command in step 640, which is performed similarly to step 625. Then, in step 645, the switch 65 sets the lock flag 61 and sets the request data Rd1 70 into the field 62 of the lock register 80, and also sets the request data Rd2 75 into the field 67 of the lock register 85, then broadcasts the lock register 80 information to all memory controllers 21, 36, and 97. In step 650, node 0, node 1, node 2, and node 3 flush all request queues and signal their respective processors to retry all requests except write-backs to the soon-to-be locked address. Following the sequence shown in FIGS. 2–3, the memory controllers 21, 36, and 97 update their shadow lock registers 60a, 60b, and 60c (and 63a, 63b, and 63c if a split lock was used in step 655), granting exclusive access to the memory location to processor 20a. The memory controller 21 then waits for the lock request to be retried by processor 20a, possibly performing other memory accesses or other actions in the interim. Then the processor 20a retries the lock request in step 660, returning to step 610. In step 660, the processor 20a reasserts the lock request and again the control is transferred to step 610.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

I claim:

1. A method of controlling access to a shared memory of a multiprocessor system, the multiprocessor system comprising a first bus and a second bus coupled to the shared memory, the first bus coupled to a first processor, and the second bus coupled to a second processor, the method comprising the steps of:
   requesting exclusive access to a first memory location of the shared memory by the first processor;
   granting exclusive access to the first memory location of the shared memory to the first processor;
   allowing access to a second memory location of the shared memory to the second processor while the first processor has exclusive access to the first memory location; and
   storing access request information associated with the exclusive access in a first register in a first memory controller and in a second register in a second memory controller,
   the step of requesting exclusive access comprising the steps of:
     asserting a lock signal on the first bus;
     sending a lock request from the first processor to the first memory controller coupled to the first bus, the second bus, and the shared memory;
     forwarding the lock request from the first memory controller to a switch; and
     signaling the first processor to retry the lock request,
   the step of granting exclusive access comprising the steps of:
     signaling the first memory controller by the switch to retry the lock request;
     assigning exclusive access to the first memory location by the switch;
     notifying the first memory controller of the exclusive access assigned in the assigning step; and
     granting exclusive access to the first memory location by the first memory controller responsive to a retry of the lock request by the first processor,
   the step of assigning exclusive access to the first memory location by the switch comprising the steps of:
     determining if the first memory location is currently assigned;
     saving the access request information in a register in the switch if the first memory location is not currently assigned;
     sending the access request information to the first memory controller; and
     sending the access request information to the second memory controller.

2. The method of claim 1, the step of asserting a lock signal further comprising the step of:
   asserting a split lock signal on the first bus, the split lock signal indicating that the lock request contains two memory address data.

3. The method of claim 1, the access request information comprising:
   a node ID of the first processor;
   a cycle ID of the first processor; and
   memory address data for the first memory location.

4. The method of claim 3, the memory address data comprising:
   a first memory address; and
   a second memory address,
   wherein the first memory address can be non-contiguous with the second memory address.

5. The method of claim 1, further comprising the step of:
   releasing exclusive access to the first memory location.

6. The method of claim 1, where in the access request information in the second register in the second memory controller is a shadow copy of the access request information in the first register in the first memory controller.

7. A method of controlling access to memory of a multinodal computer system, the multinodal computer system comprising a plurality of multiprocessor nodes, the method comprising the steps of:
requesting exclusive access to a first memory location of a shared memory in a first multiprocessor node of the plurality of multiprocessor nodes by a first processor of the first multiprocessor node;
grunting exclusive access to the first memory location of the shared memory to the first processor;
allowing access to a second memory location of the shared memory to a second processor of a second multiprocessor node of the plurality of multiprocessor nodes while the first processor has exclusive access to the first memory location;
communicating between the multiprocessor nodes through a switch; and
sending, by the switch, access request information associated with the exclusive access of the shared memory of the first multiprocessor node to the second multiprocessor node.

8. The method of claim 7, the requesting step comprising:
asserting a lock signal on a first bus, the first bus coupling the first processor and a first memory controller of the first multiprocessor node; and
sending a lock request to the first memory controller;
forwarding the lock request from the first memory controller to the switch, the switch coupled to each of the plurality of multiprocessor nodes.

9. The method of claim 8, the shared memory comprising:
a first memory coupled to the first memory controller; and
a second memory coupled to a second memory controller in the second multiprocessor node of the plurality of multiprocessor nodes.

10. The method of claim 9, the step of asserting a lock signal comprising the step of:
asserting a split lock signal on the first bus, the split lock signal indicating that the lock request contains a first memory address data and a second memory address data.

11. The method of claim 10, the first memory address data referencing the first memory and the second memory address data referencing the second memory.

12. The method of claim 10, the first memory address data referencing the second memory and the second memory address data referencing the first memory.

13. The method of claim 8, the step of requesting exclusive access further comprising:
signaling the first processor to retry the lock request.

14. The method of claim 8, the step of granting exclusive access comprising the steps of:
signaling the first memory controller to retry the lock request;
assigning exclusive access to the first memory location by the switch;
notifying the first memory controller of the exclusive access assigned in the assigning step; and
assigning exclusive access to the first memory location by the first memory controller responsive to a retry of the lock request by the first processor.

15. The method of claim 14, the step of assigning exclusive access to the first memory location by the switch comprising the steps of:
determining if the first memory location is currently assigned;
saving the access request information associated with the exclusive access if the first memory location is not current assigned; and
broadcasting the access request information to each memory controller of each of the plurality of multiprocessor nodes.

16. The method of claim 15, the access request information comprising:
a node ID of the first multiprocessor node;
a cycle ID of the first processor; and
a memory address data for the first memory location.

17. The method of claim 7, further comprising the step of:
releasing exclusive access to the first memory location.

18. The method of claim 7, further comprising:
the switch forwarding the access request information to a second memory controller in the second multiprocessor node; and
the second memory controller storing the access request information in the second memory controller.

19. The method of claim 7, further comprising:
storing the access request information in a first register of a first memory controller in the first multiprocessor node and in a second register in a second memory controller in the second multiprocessor node.

20. The method of claim 19, further comprising storing the access request information in a register in the switch, wherein the access information in the first register of the first memory controller and in the second register of the second memory controller are shadow copies of the access request information in the register of the switch.

21. A computer system for utilizing a shared memory, the computer system comprising:
a first multiprocessor node, comprising:
a first processor bus;
a first processor, coupled to the first processor bus, the first processor comprising:
circuitry to generate an exclusive access request for a first memory location,
a second processor bus;
a second processor, coupled to the second processor bus, the second processor adapted to:
request access to a second memory location;
a first memory;
a first memory controller, coupled to the first processor bus, the second processor bus, and the first memory, the first memory controller adapted to:
allow exclusive access to the first memory location by the first processor;
allow access to the second memory location by the second processor while the first processor has exclusive access to the first memory location;
a second multiprocessor node, comprising:
a third processor bus;
a third processor, coupled to the third processor bus, the third processor adapted to:
request access to a third memory location;
a second memory;
a second memory controller, coupled to the third processor bus, and the first memory, the second memory controller adapted to:
allow exclusive access to the first memory location by the first processor;
allow access to the second memory location by the second processor while the first processor has exclusive access to the first memory location; and allow access to the third memory location by the third processor while the first processor has exclusive access to the first memory location; and a switch, coupled to the first memory controller and the second memory controller, for switching transactions between the first multiprocessor node and the second multiprocessor node.

22. The computer system of claim 21, the first memory location comprising:
   a first portion in the first memory; and
   a second portion in the second memory.

23. The computer system of claim 21,
   wherein the first memory location is in the first memory, and
   wherein the second memory location is in the first memory.

24. The computer system of claim 21,
   wherein the first memory location is in the first memory, and
   wherein the third memory location is in the first memory.

25. The computer system of claim 21,
   wherein the first memory location is in the second memory, and
   wherein the third memory location is in the second memory.

26. The computer system of claim 21,
   wherein the first memory location is in the second memory, and
   wherein the third memory location is in the first memory.

27. The computer system of claim 21, the switch comprising:
   a lock register for storing a lock control information.

28. The computer system of claim 27, the lock control information comprising:
   a node ID corresponding to the first processor;
   a cycle ID corresponding to the first processor; and
   a first memory address corresponding to the first memory location.

29. The computer system of claim 28, the lock control information further comprising:
   a second memory address corresponding to the first memory location.

30. The computer system of claim 28, the switch comprising:
   circuitry to signal the first memory controller to retry allowing exclusive access to the first memory location by the first processor;
   circuitry to arbitrate among requests for exclusive access to the first memory location;
   circuitry to broadcast the lock control information to the first memory controller and the second memory controller.

31. The computer system of claim 30, the first memory controller further comprising:
   circuitry to signal the first processor to retry the exclusive access request;
   circuitry to shadow the lock control information broadcast by the switch; and
   the second memory controller further comprising:
   circuitry to shadow the lock control information broadcast by the switch.

32. The computer system of claim 29, wherein the first memory address can be in either the first memory or the second memory, and
   wherein the second memory address can be in either the first memory or the second memory.

33. A method of controlling access to a shared memory of a multiprocessor system, the multiprocessor system comprising a first bus and a second bus coupled to the shared memory, the first bus coupled to a first processor, and the second bus coupled to a second processor, the method comprising the steps of:
   requesting exclusive access to a first memory location of the shared memory by the first processor;
   granting exclusive access to the first memory location of the shared memory to the first processor;
   allowing access to a second memory location of the shared memory to the second processor while the first processor has exclusive access to the first memory location;
   wherein requesting exclusive access comprises:
   sending a lock request from the first processor to a first memory controller coupled to the shared memory;
   forwarding the lock request from the memory controller to a switch; and
   the switch broadcasting lock request information to the first memory controller and at least another memory controller.

34. The method of claim 33, further comprising:
   each of the first memory controller and at least another memory controller storing the lock request information.

35. The method of claim 34, further comprising the switch storing the lock request information in a register in the switch,
   wherein the memory controllers also store the lock request information in respective registers in the memory controllers.

36. A multiprocessor system comprising:
   a plurality of multiprocessor nodes, each of the multiprocessor nodes comprising:
   a shared memory;
   a processor to request exclusive access of a memory location in the shared memory;
   a memory controller to forward access request information associated with the exclusive access from the multiprocessor node for storage of the access request information in another multiprocessor node, the memory controller including a register; and
   a switch coupled to the multiprocessor nodes, the switch to receive the access request information and to send the access request information to the multiprocessor nodes for storage of the access request information in the respective registers of the memory controllers.

37. The multiprocessor system of claim 36, wherein the switch includes a register to store the access request information,
   wherein the access request information in the registers of the respective memory controllers are shadow copies of the access request information in the register of the switch.

* * * * *